(12) United States Patent
Vassilieva et al.

(10) Patent No.: US 9,461,745 B2
(45) Date of Patent: Oct. 4, 2016

(54) OPTIMIZING OPTICAL NETWORK SIMULATIONS

(75) Inventors: Olga Vassilieva, Plano, TX (US); Inwoong Kim, Allen, TX (US); Motoyoshi Sekiya, Richardson, TX (US)

(73) Assignee: FUJITSU LIMITED, Kawasaki (JP)

( * ) Notice: Subject to any disclaimer, the term of this patent is extended or adjusted under 35 U.S.C. 154(b) by 1101 days.

(21) Appl. No.: 13/427,071

(22) Filed: Mar. 22, 2012

(65) Prior Publication Data
US 2013/0253896 A1 Sep. 26, 2013

(51) Int. Cl.
*G06F 7/60* (2006.01)
*H04B 10/27* (2013.01)

(52) U.S. Cl.
CPC ..................... *H04B 10/27* (2013.01)

(58) Field of Classification Search
CPC ..................................... H04B 10/27
USPC ............................................. 703/2
See application file for complete search history.

(56) References Cited

U.S. PATENT DOCUMENTS

| | | | | |
|---|---|---|---|---|
| 6,778,782 B1* | 8/2004 | Watley | .............. | H04B 10/2519 385/11 |
| 8,566,073 B2* | 10/2013 | Dou | .................. | H04Q 11/0062 703/13 |
| 2002/0149823 A1* | 10/2002 | Bergano et al. | .............. | 359/156 |
| 2003/0169998 A1* | 9/2003 | Premaratne | ............ | H04B 10/27 385/147 |
| 2003/0223759 A1* | 12/2003 | Corbel et al. | ................. | 398/147 |
| 2005/0147341 A1* | 7/2005 | Patel | ........................ | G01L 1/242 385/12 |
| 2005/0265727 A1* | 12/2005 | Glingener | ............... | H04J 14/06 398/152 |
| 2007/0136012 A1* | 6/2007 | Miller | .............. | G01R 31/31709 702/67 |
| 2007/0146860 A1* | 6/2007 | Kikuchi | ....................... | 359/239 |
| 2008/0297768 A1* | 12/2008 | Szafraniec | ........... | G01M 11/336 356/73 |
| 2009/0141274 A1* | 6/2009 | Szafraniec | ........... | G01M 11/337 356/364 |
| 2009/0169212 A1* | 7/2009 | Onaka et al. | .................. | 398/79 |
| 2011/0020012 A1* | 1/2011 | Miyasaka et al. | ............ | 398/202 |
| 2011/0170869 A1* | 7/2011 | Mandai et al. | ................. | 398/65 |

OTHER PUBLICATIONS

Mark Shtaif("Performance degradation in coherent polarization multiplexed systems as a result of polarization dependent loss", Optical Society of America,2008,pp. 1-15).*
Roberts et al.("Performance of Dual-Polarization QPSK for Optical Transport Systems", IEEE, 2009, pp. 3546-3559).*
Duthel at al., "Impact of Polarization Dependent Loss on Coherent POLMUX-NRZ-DQPSK" in Proceedings OFC'2008, paper OThU5 (2008).*
Mori et al.("Statistics and performance under combined impairments induced by polarization-dependentloss in polarization-division-multiplexing digital coherent transmission", Optical Society of America, 2011, pp. 1-8 ).*
Vassilieva, et al., "Interplay between PDL and Nonlinear Effects in Coherent Polarization Multiplexed Systems", ECOC Technical Digest, 2011, pp. 1-3.

* cited by examiner

*Primary Examiner* — Omar Fernandez Rivas
*Assistant Examiner* — Iftekhar Khan
(74) *Attorney, Agent, or Firm* — Maschoff Brennan

(57) ABSTRACT

According to an aspect of an embodiment, a method of modeling an optical signal transmission path may include obtaining first transmission characteristics of an optical signal transmission path within an optical network based on a parameter of the optical network and randomly changing states of polarization of an optical signal within the optical signal transmission path. The method may also include obtaining second transmission characteristics of the optical signal transmission path based on the parameter and a first fixed state of polarization of the optical signal. The method may also include correlating the first transmission characteristics with the second transmission characteristics to obtain an effective state of polarization of the optical signal. A simulation of the optical signal transmission path based on the parameter and the effective state of polarization of the optical signal may produce transmission characteristics that may approximate the first transmission characteristics.

16 Claims, 9 Drawing Sheets

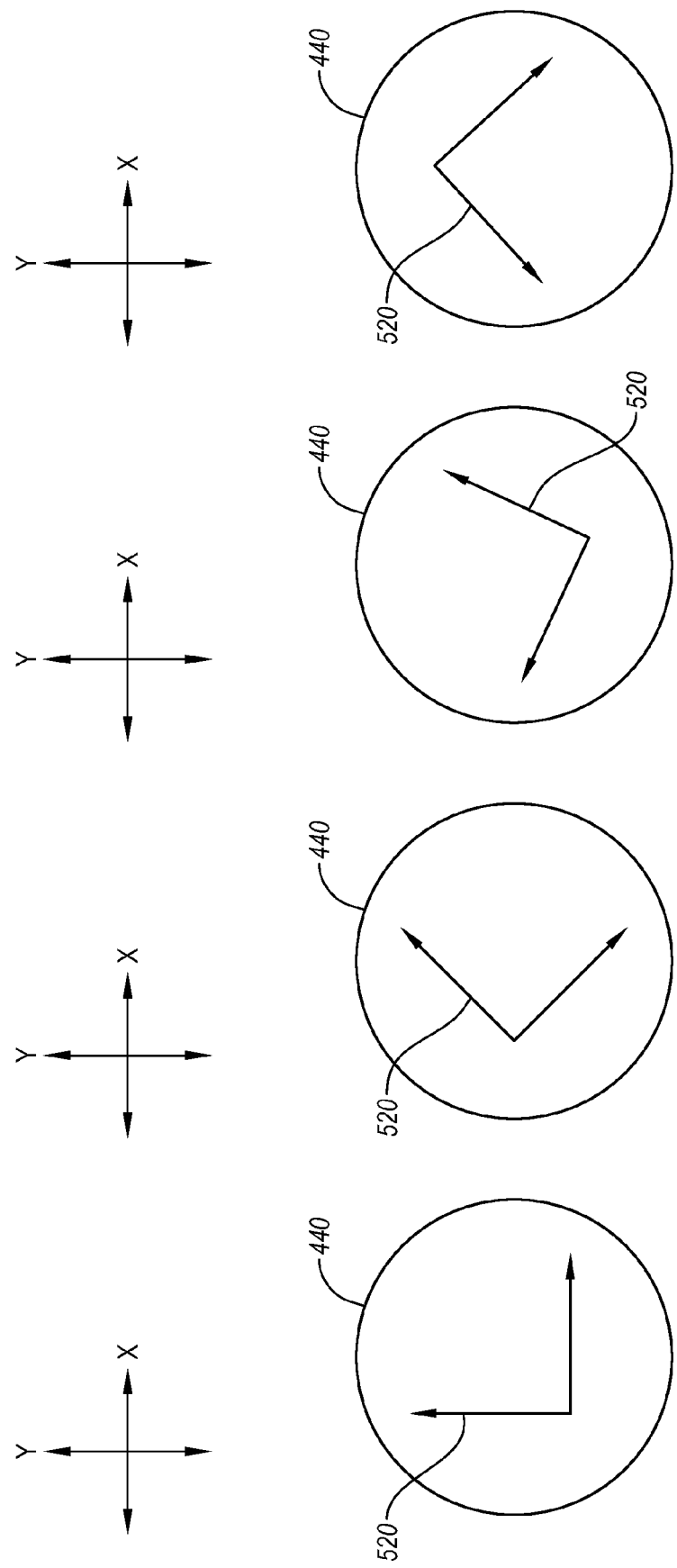

OPTIMIZING OPTICAL NETWORK SIMULATIONS

FIELD

The embodiments discussed herein are related to optical network design.

BACKGROUND

Optical networks have been established to transmit data around the world. Due to increasing data throughput requirements of optical networks, data rates within the optical networks have also been increasing. One way to increase data rates within an optical network is to increase the amount of data carried by an optical signal. For example, instead of performing simple amplitude modulation of an optical signal, each polarization component of the optical signal may be modulated with data. By modulating each polarization component of the optical signal, the data rate may be doubled as compared to simply modulating the amplitude of the optical signal.

As existing optical networks are upgraded to support additional modulation formats and as new optical networks are being constructed, an understanding of optical network design is essential to ensure accurate transmission quality of optical signals within an optical network. An essential component of optical network design may be the modeling of transmission characteristics of an optical network. Modeling the transmission characteristics of an optical network provides insight on how transmission degradation factors, such as chromatic dispersion, nonlinear effects, polarization effects, and others may affect optical signals within the optical network. In particular, at higher data rates, the interaction between these degradation factors may be particularly important. Accurately modeling these degradation factors may require thousands of simulations using an optical modeling system, resulting in lengthy modeling times.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of modeling an optical signal transmission path may include obtaining first transmission characteristics of an optical signal transmission path within an optical network based on a parameter of the optical network and randomly changing states of polarization of an optical signal within the optical signal transmission path. The method may also include obtaining second transmission characteristics of the optical signal transmission path based on the parameter and a first fixed state of polarization of the optical signal. The method may also include correlating the first transmission characteristics with the second transmission characteristics to obtain an effective state of polarization of the optical signal. A simulation of the optical signal transmission path based on the parameter and the effective state of polarization of the optical signal may produce transmission characteristics that may approximate the first transmission characteristics.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIGS. 5A-5D illustrate first example cross sectional views along the lines A-A, B-B, C-C, D-D, respectively, of FIG. 4;

DESCRIPTION OF EMBODIMENTS

Some embodiments described herein may include a method of modeling an optical signal transmission path within an optical network. In particular, some embodiments described herein may include a method of modeling an optical signal transmission path that reduces the number of simulations to model the optical signal transmission path compared to the number of simulations to model an optical signal transmission path according to conventional techniques.

With some conventional techniques, thousands or tens of thousands of simulations are performed to accurately model degradation factors of an optical signal transmission path within an optical network due to an optical signal's state of polarization randomly rotating as the optical signal traverses the optical signal transmission path. To reduce the number of simulations to model an optical signal transmission path, a method of modeling the optical signal transmission path may involve obtaining first transmission characteristics of the optical signal transmission path of an optical network based on a parameter of the optical network and randomly changing states of polarization of an optical signal within the optical signal transmission path. The method may also involve obtaining second transmission characteristics of the optical signal transmission path based on the parameter and a first fixed state of polarization of the optical signal. The first transmission characteristics may be correlated with the second transmission characteristics to obtain an effective state of polarization of the optical signal so that a simulation of the optical signal transmission path based on the parameter and the effective state of polarization of the optical signal approximates the first transmission characteristics.

Using an effective state of polarization of an optical signal may allow accurate modeling of an optical network by performing two or three orders of magnitude fewer simulations. For example, in some embodiments, ten or fewer simulations may be performed using an effective state of polarization of an optical signal to obtain results that would otherwise require thousands or tens of thousands of simulations.

Embodiments of the present invention will be explained with reference to the accompanying drawings.

Figure 1:
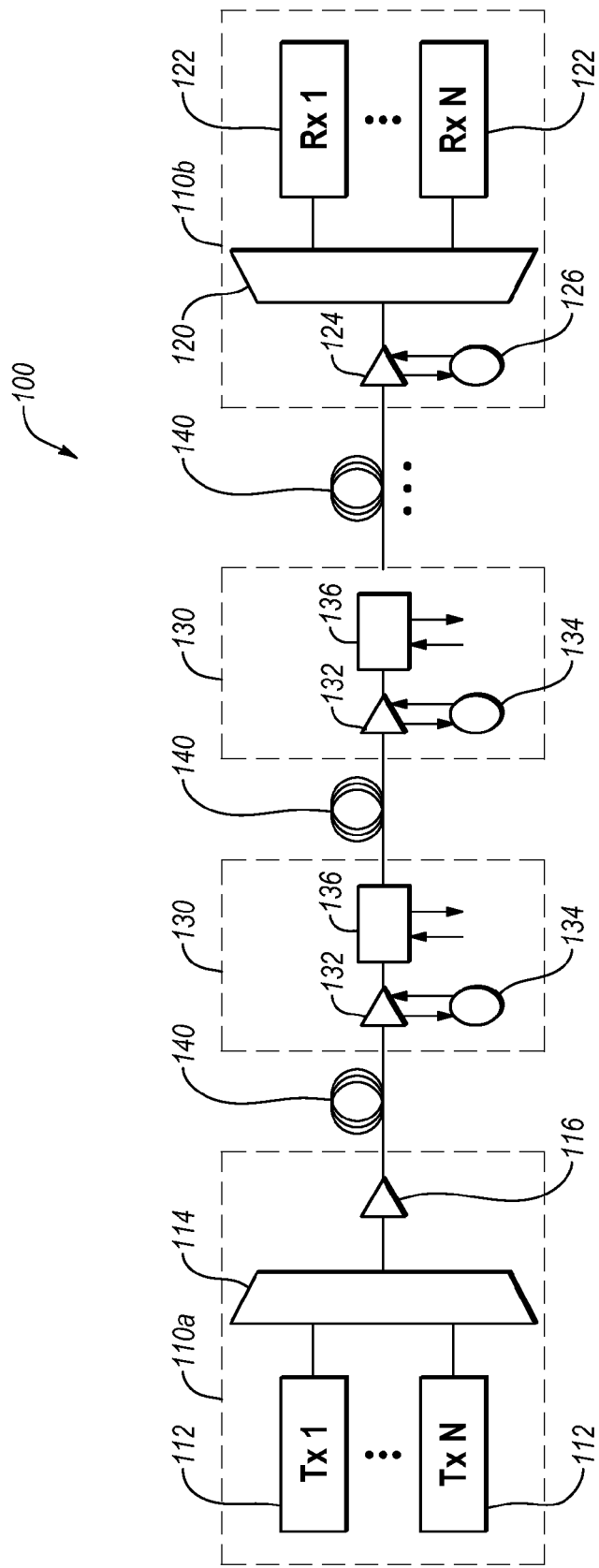
FIG. 1 is a block diagram of an example optical network.

FIG. 1 is a block diagram of an example optical network 100, arranged in accordance with at least some embodiments described herein. The optical network 100 may include an optical fiber 140 configured to transport one or more optical signals communicated by components of the optical network 100. The components of the optical network 100, coupled by the optical fiber 140, may include terminal nodes 110a, 110b and optical nodes 130. Although the optical network 100 is illustrated as a point-to-point optical network with terminal nodes 110a, 110b, the optical network 100 may be configured as a ring optical network, a mesh optical network, or any other optical network or combination of networks. The optical network 100 may be used as a short-haul network, a long-haul network, or any other optical network or combination of optical networks. The optical fiber 140 may include any suitable type of optical fiber, such as, Single-Mode Fiber (SMF), Enhanced Large Effective Area Fiber (E-LEAF), Dispersion Compensating Fiber (DCF), Multi-Mode Fiber (MMF), among others, as well as combinations thereof.

The terminal node 110a may include one or more transceivers 112, a multiplexer 114, and an amplifier 116. Each of the transceivers 112 may include any type of transceiver configured to modulate an optical signal to encode data thereon and transmit the optical signal within the optical network 100. Each of the optical signals transmitted by the transceivers 112 may be centered at a different particular wavelength and may be referred to as a wavelength channel. The multiplexer 114 may be configured to combine multiple wavelength channels from transceivers 112 into a multiplexed signal and transmit the multiplexed signal into the optical fiber 140. For example, the multiplexer 114 may include a wavelength selective switch (WSS). The amplifier 116 may be configured to amplify the multiplexed signal and in some embodiments, may include an optical repeater.

The optical nodes 130 may include an amplifier 132, an optical dispersion compensating module (DCM) 134, and an add/drop module (ADM) 136. The amplifier 132 may be similar to the amplifier 116 and may be configured to amplify the multiplexed signal. The DCM 134 may be configured to perform optical dispersion compensation on one or more wavelength channels carrying data within the multiplexed signal. The ADM 136 may be configured to add or drop wavelength channels carrying data within the multiplexed signal as well as compensate for optical dispersion of one or more of the wavelength channels.

The terminal node 110b may include transceivers 122, a demultiplexer 120, an amplifier 124, and a DCM 126. The amplifier 124 may be configured to amplify the multiplexed signal and in some embodiments, may include an optical repeater. The DCM 126 may be configured to perform optical dispersion compensation on one or more wavelength channels of the multiplexed signal. The demultiplexer 120 may be configured to separate the amplified multiplexed signal received from the amplifier 124 and/or DCM 126 into separate wavelength channels, each of which may be passed to a corresponding one of the transceivers 122. For example, the demultiplexer 120 may include a wavelength selective switch (WSS). Each of the transceivers 122 may be any type of transceivers configured to receive a corresponding wavelength channel and to demodulate it into an electrical signal. In some embodiments, the transceivers 122 may be coherent receivers that include digital signal processing.

In some embodiments, the optical network 100 as illustrated may be an optical signal transmission path that extends between and includes the terminal nodes 110a, 110b. In other embodiments, an optical signal transmission path in the optical network 100 may extend between the terminal node 110a and one of the optical nodes 130. The optical network 100 is illustrated as an example optical network that includes one or more optical signal transmission paths and should not be limiting. In some embodiments, the optical network 100 may include more or less than two optical nodes 130. Alternately or additionally, the optical nodes 130 may include components other than those illustrated in FIG. 1. Furthermore, in some embodiments, the terminal nodes 110a, 110b may include components other than those illustrated in FIG. 1. Alternately or additionally, the terminal nodes 110a, 110b may both be configured to receive and transmit optical signals over the optical network 100.

The optical network 100 may be used as an example optical network when discussing optical modeling of an optical network. Optical modeling of an optical network may include determining transmission characteristics of an optical signal transmission path in the optical network. The transmission characteristics of the optical signal transmission path may provide insight on how transmission degradation factors, such as chromatic dispersion (CD), nonlinear (NL) effects, polarization effects, such as polarization mode dispersion (PMD) and polarization dependent loss (PDL), amplified spontaneous emission (ASE) and others may affect optical signals along the optical signal transmission path. For example, optical modeling of the optical network 100 may provide insight into how the various components within the optical network 100, such as the amplifiers 116, 132, 124, the ADMs 136, the DCMs 134, the optical fiber 140, and other components result in transmission degradation of an optical signal transmitted along the optical signal transmission path in the optical network 100. In particular, optical modeling of the optical signal transmission path in the optical network 100 may provide insight into how specific types of different transmission degradation factors lead to transmission degradation of an optical signal.

Figure 2B:
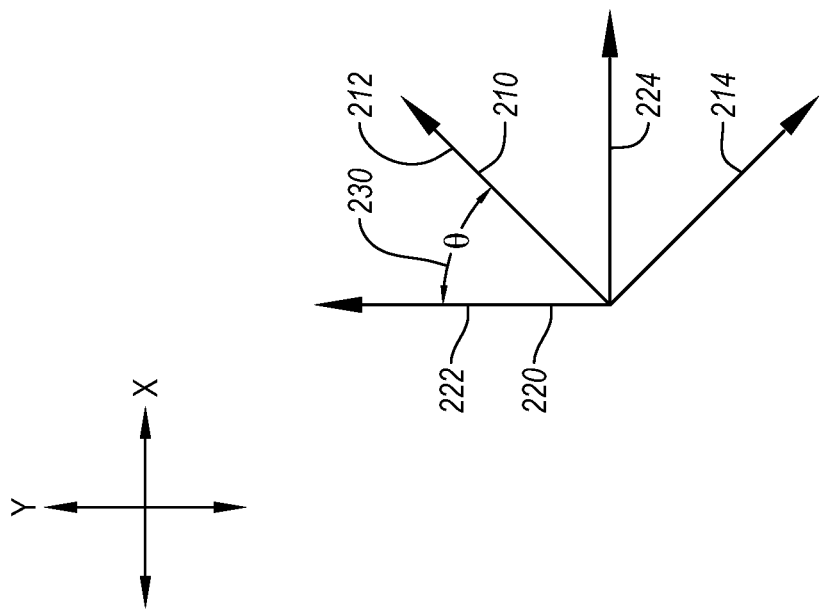
FIGS. 2A and 2B illustrate example components of an optical signal and polarization dependent loss of the optical signal.
Figure 2A:
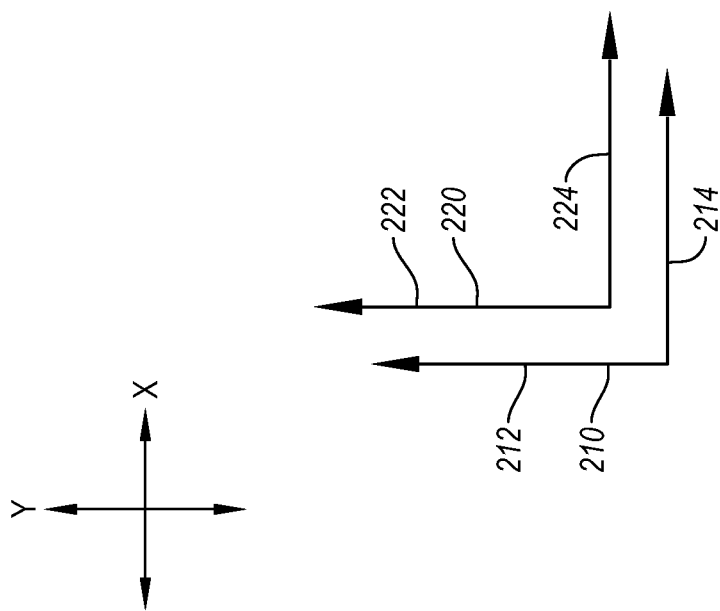

As noted above, the transmission degradation factors may result in signal degradation of an optical signal. Degradation of an optical signal may also be expressed as an optical signal to noise ratio (OSNR) penalty. Thus, the degradation of an optical signal due to a specific degradation factor may be referred to as the OSNR penalty of that degradation factor. For example, degradation of an optical signal due to PDL may be referred to as the PDL OSNR penalty. Besides reducing the OSNR of an optical signal, the degradation factors may have other effects on the optical signal. For example, fiber birefringence may cause a state of polarization of the optical signal to randomly rotate. The state of polarization of the optical signal randomly rotating results in random accumulation of PDL because PDL accumulates based on an orientation or angle between the axis of PDL and an axis of polarization of the optical signal. In some circumstances, particularly at higher data rates, for example, at 40 gigabits per second and higher data rates, the PDL may affect the amount of OSNR penalties contributed from other signal degradation factors, such as NL effects. FIGS. 2A and 2B illustrate example components of an optical signal 210 and PDL 220, arranged in accordance with at least some embodiments described herein. The optical signal 210 may have first and second polarization components 212, 214. Likewise, the PDL 220 may have first and second polarization components 222, 224. As illustrated in FIG. 2A, the optical signal 210 and the PDL 220 may be oriented with respect to an x-axis and y-axis of a Cartesian coordinate system. The first components 212, 222 of the optical signal 210 and the PDL 220 may be oriented along the y-axis and the second components 214, 224 of the optical signal 210 and the PDL 220 may oriented along the x-axis.

A state of polarization of an optical signal indicates a relationship between the first and second polarization components 212, 214 of the optical signal 210 and the orientation of the first and second polarization components 212, 214 with respect to each other and with respect to a direction of propagation of the optical signal 210. In at least some states of polarization, having the state of polarization of the optical signal 210 randomly rotating indicates that the first and second polarization components 212, 214 randomly rotate within the xy plane so that the first and second polarization components 212, 214 are not aligned with the y-axis and the x-axis, respectively. The random rotation of the optical signal 210 may occur to the right or left and at varying amounts of rotation.

FIG. 2B illustrates the optical signal 210 rotated so that the first and second polarization components 212, 214 are not aligned with the y-axis and the x-axis, respectively. When the optical signal 210 rotates, the optical signal 210 forms an angle 230 between an axis of polarization of the optical signal 210 and an axis of the PDL 220. The angle 230 between the axis of polarization of the optical signal 210 and the PDL 220 may be referred to herein as the PDL angle of the optical signal 210. The angle 230 between the axis of polarization of the optical signal 210 and the axis of the PDL 220 as illustrated in FIG. 2B is 45 degrees. This angle 230 is shown by way of illustration only. The angle 230 may vary as the optical signal 210 is randomly rotated as it traverses an optical signal transmission path.

Figure 3:
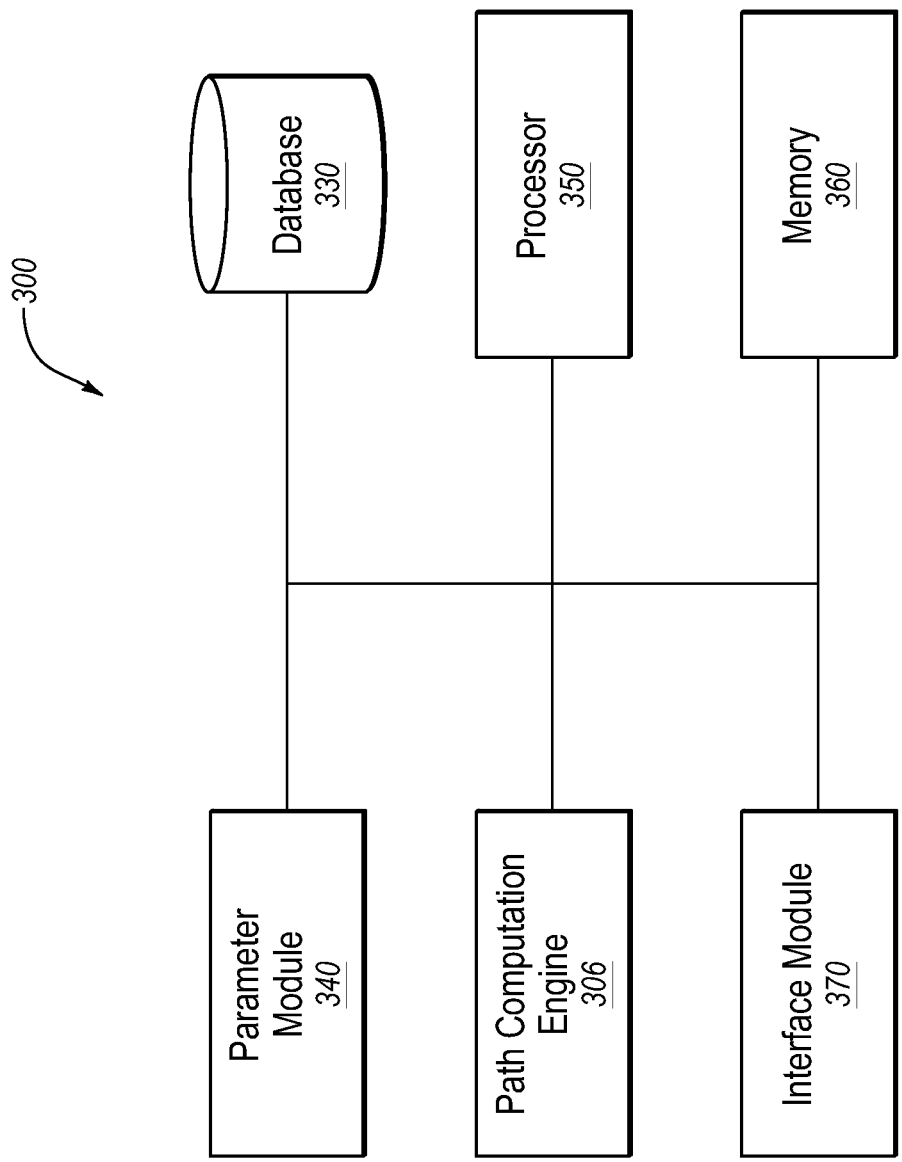
FIG. 3 is a block diagram of an example system for modeling transmission characteristics of an optical signal transmission path.

FIG. 3 is a block diagram of an example system 300 for modeling transmission characteristics of an optical signal transmission path, arranged in accordance with at least some embodiments described herein. The system 300 may include a path computation engine 306, a database 330, a parameter module 340, a processor 350, a memory 360, and an interface module 370.

The interface module 370 may be configured to receive data concerning an optical signal transmission path in an optical network that is to be modeled. For example, in some embodiments, the interface module 370 may be configured to interface with a person and receive data about the optical signal transmission path. Alternately or additionally, the interface module 370 may be configured to receive data about the optical signal transmission path from a device. The interface module 370 may receive data about the optical signal transmission path, such as, fiber type; fiber length; number and/or type of components, such as a DCM, ADM, amplifier, multiplexer, or demultiplexer, in the optical signal transmission path; data rate; modulation format of the data; input power of the optical signal; number of signal carrying wavelengths, which may be referred to herein as channels; channel spacing; traffic demand; network topology; among others.

The interface module 370 may include and/or may be coupled to one or more input devices and/or output devices to facilitate receiving data about the optical signal transmission path from the person and/or outputting simulation results to the person. The one or more input and/or output devices may include, but are not limited to, a keyboard, a mouse, a touchpad, a microphone, a display, a touchscreen display, an audio speaker, or the like.

The parameter module 340 may be configured to provide parameters concerning the optical signal transmission path based on the data received about the optical signal transmission path. For example, the parameter module 340 may provide parameters regarding the fiber type, such as a dispersion map for the fiber type and other optical properties of the fiber type. As another example, the parameter module 340 may provide parameters concerning the components in the optical signal transmission path. For example, the parameters of the components provided by the parameter module 340 may include the PDL of the components and other optical properties of the components. In essence, the parameter module 340 may provide some of or all of the optical properties of the components in the optical signal transmission path that the path computation engine 306 may use to model the optical signal transmission path.

The path computation engine 306 may be configured to use the parameters from the parameter module 340 and the data from the interface model 370 to determine transmission characteristics of the optical signal transmission path. The transmission characteristics of the optical signal transmission path may provide insight on how transmission degradation factors, such as chromatic dispersion (CD), nonlinear (NL) effects, polarization effects, such as polarization mode dispersion (PMD) and polarization dependent loss (PDL), amplified spontaneous emission (ASE) and/or others may affect optical signals within the optical signal transmission path. To determine the transmission characteristics of the optical signal transmission path, the path computation engine 306 may consider the interplay between the transmission degradation factors.

In some embodiments, the path computation engine 306 may provide the accumulated amount of each transmission degradation factor for the optical signal transmission path. Alternately or additionally, the path computation engine 306 may provide the OSNR penalty due to each transmission degradation factor. Alternately or additionally, the path computation engine 306 may provide the OSNR penalty due to a combination of one or more transmission degradation factors. For example, in some embodiments, a combined NL and PDL OSNR penalty may be higher than the combination of separately determined NL and PDL OSNR penalties because a combined NL and PDL OSNR penalty may take into account the interplay between NL effects and PDL effects in an optical signal transmission path. Alternately or additionally, the path computation engine 306 may provide the total OSNR of the optical signal transmission path. The total OSNR may be the optimal OSNR that may be achieved along the optical signal transmission path without any degradation. In some embodiments, the path computation engine 306 may provide additional information regarding the optical signal transmission path.

The database 330 may be configured to store the data produced by the path computation engine 306 about the optical signal transmission path. The processor 350 may be configured to execute computer instructions that cause the system 300 to perform the functions and operations described herein. The computer instructions may be loaded into the memory 360 for execution by the processor 350 and/or data generated, received, or operated on during performance of the functions and operations described herein may be at least temporarily stored in the memory 360.

To accurately simulate some of the transmission characteristics of the optical signal transmission path due to the randomly rotating states of polarization of an optical signal in the optical signal transmission path, the path computation engine 306 may run at least a thousand simulations using varying states of polarization of the optical signal to determine the transmission characteristics of the optical signal transmission path. In particular, to simulate transmission characteristics, such as the PDL and NL effects and interplay between the PDL and NL effects, the path computation 306 may run at least a thousand simulations using varying states of polarization of the optical signal. In some embodiments, the system 300 may determine a combined NL and PDL OSNR penalty, which may take into account the PDL effects, the NL effects, and the interplay between the PDL and NL effects. The system 300 may alternatively use an effective state of polarization of an optical signal (effective state of polarization) to approximate the transmission characteristics, such as the PDL and NL effects and interplay between the PDL and NL effects, of the optical signal transmission path. The effective state of polarization allows the path computation engine 306 to run ten or fewer simulations using a fixed state of polarization of an optical signal to approximate the transmission characteristics of the optical signal transmission path. In particular, the effective state of polarization allows the path computation engine 306 to approximate the interplay between PDL and NL effects of the optical signal transmission path. In short, the effective state of polarization is a fixed state of polarization of an optical signal that produces transmission characteristics when simulated that approximate the transmission characteristics that result from simulating randomly changing states of polarization of the optical signal.

An effective state of polarization may be different for different types of optical signal transmission paths. In particular, an effective state of polarization may be different for different parameters within optical signal transmission paths. For example, the effective state of polarization may be determined for different fiber types, modulation formats, and/or dispersion characteristics of an optical signal transmission path.

To determine an effective state of polarization for an optical signal transmission path with a particular parameter, a model of the optical signal transmission path may be produced with the particular parameter for simulation by the path computation engine 306. A discussion of determining the effective state of polarization for an optical signal transmission path follows with reference to FIGS. 3, 4, 5A-5D, 6A-6D, and 7.

Figure 4:
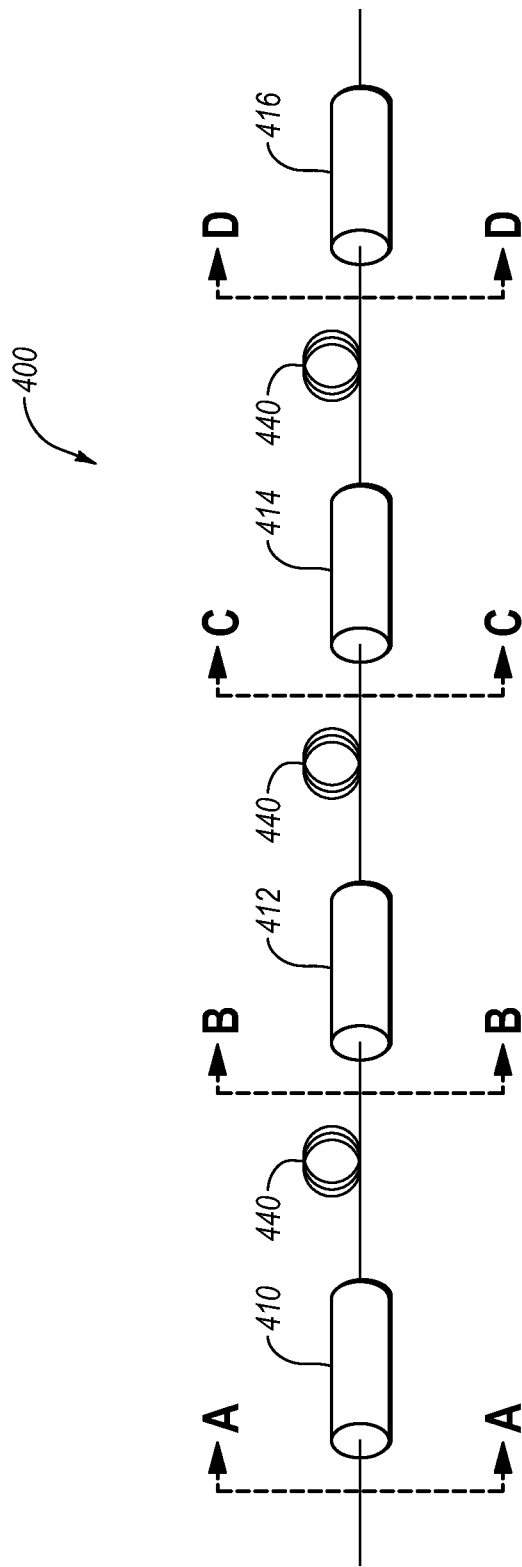
FIG. 4 is a block diagram of an example modeled optical signal transmission path.

FIG. 4 is a block diagram of an example modeled optical signal transmission path 400, arranged in accordance with at least some embodiments described herein. The modeled optical signal transmission path 400 includes modeled optical nodes 410, 412, 414, 416 interconnected by optical fiber 440. The modeled optical nodes 410, 412, 414, 416 may represent and have characteristics to model nodes in an optical network, such as the terminal nodes 110a, 110b and the optical nodes 130 in the optical network 100 illustrated in FIG. 1.

With combined reference to FIGS. 3-4, the path computation engine 306 may be configured to perform multiple simulations on the modeled optical signal transmission path 400 with randomly changing states of polarization of an optical signal. For example, in some embodiments, the path computation engine 306 may perform 1000, 5000, 10000, or more simulations of the modeled optical signal transmission path 400. To simulate the randomly changing states of polarization of an optical signal within the modeled optical signal transmission path 400, the path computation engine 306 may randomly rotate the optical signal to different orientations at different locations within the modeled optical signal transmission path 400 during the simulations. Example orientations of the optical signal as it is rotated during a simulation are illustrated with respect to FIGS. 5A-5D.

FIGS. 5A-5D illustrates first example cross sectional views along the lines A-A, B-B, C-C, D-D, respectively, of FIG. 4, arranged in accordance with at least some embodiments described herein. At line A-A in FIG. 4, as illustrated in FIG. 5A, an optical signal 520 within the optical fiber 440 may be oriented so that the components of the optical signal 520 are aligned with the x-axis and the y-axis of the depicted Cartesian coordinate system. At line B-B in FIG. 4, as illustrated in FIG. 5B, the optical signal 520 may be rotated in the xy plane so that the components of the optical signal 520 are no longer aligned with axes of the depicted Cartesian coordinate system.

At line C-C in FIG. 4, as illustrated in FIG. 5C, the optical signal 520 may again be rotated in the xy plane to have an orientation distinct from previous orientations. At line D-D in FIG. 4, as illustrated in FIG. 5D, the optical signal 520 may again be rotated in the xy plane with another orientation distinct from previous orientations.

With combined reference to FIGS. 3-5, for each simulation performed of the modeled optical signal transmission path 400 with the randomly changing states of polarization of an optical signal, the path computation engine 306 may determine transmission characteristics of the modeled optical signal transmission path 400, such as an accumulated PDL, PDL OSNR penalty, NL, NL OSNR penalty, and/or combined NL and PDL OSNR penalty of the modeled optical signal transmission path 400. Based on the results from one or more of the simulations, the path computation engine 306 may determine modeled transmission characteristics of the modeled optical signal transmission path 400, such as a modeled PDL, PDL OSNR penalty, NL, NL OSNR penalty, and/or combined NL and PDL OSNR penalty of the modeled optical signal transmission path 400

In some embodiments, after obtaining the modeled transmission characteristics for the modeled optical signal transmission path 400, the parameter module 340 may adjust the PDL within the modeled optical signal transmission path 400. Note that adjusting the PDL adjusts the modeled PDL of the modeled optical signal transmission path 400. To obtain the modeled transmission characteristics of the modeled optical signal transmission path 400 after adjusting the PDL within the modeled optical signal transmission path 400, the path computation engine 306 may perform multiple simulations of the modeled optical signal transmission path 400.

The path computation engine 306 may also be configured to perform a simulation on the modeled optical signal transmission path 400 with a fixed state of polarization of an optical signal. To simulate the fixed state of polarization of an optical signal within the modeled optical signal transmission path 400, the path computation engine 306 may maintain the optical signal at a single orientation throughout the modeled optical signal transmission path 400 during the simulations. An example of maintaining the orientation of the optical signal during a simulation is illustrated with respect to FIGS. 6A-6D.

Figure 6D:
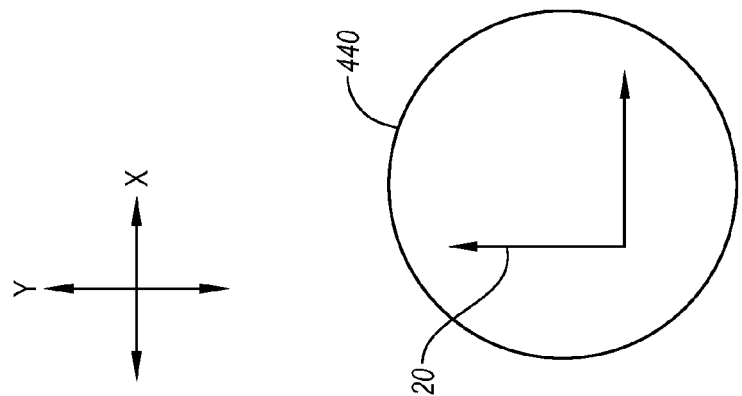
FIGS. 6A-6D illustrate second example cross sectional views along the lines A-A, B-B, C-C, D-D, respectively, of FIG. 4.
Figure 6C:
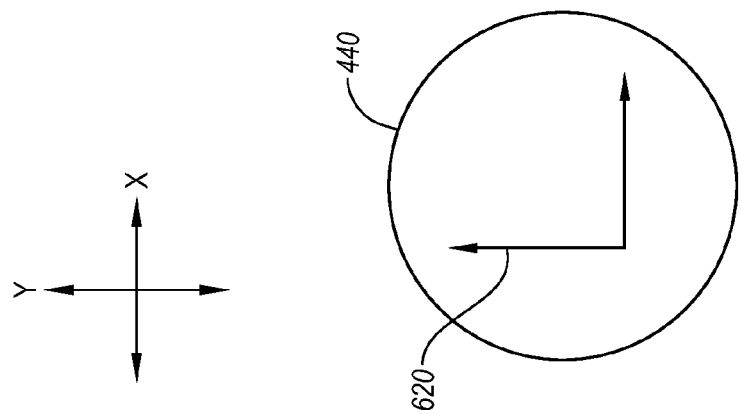
Figure 6B:
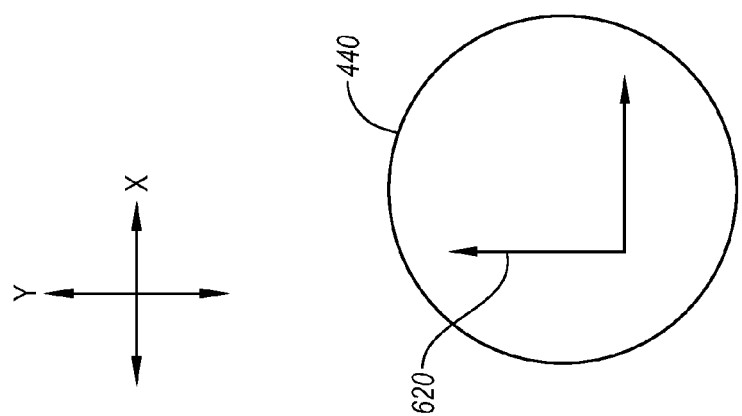
Figure 6A:
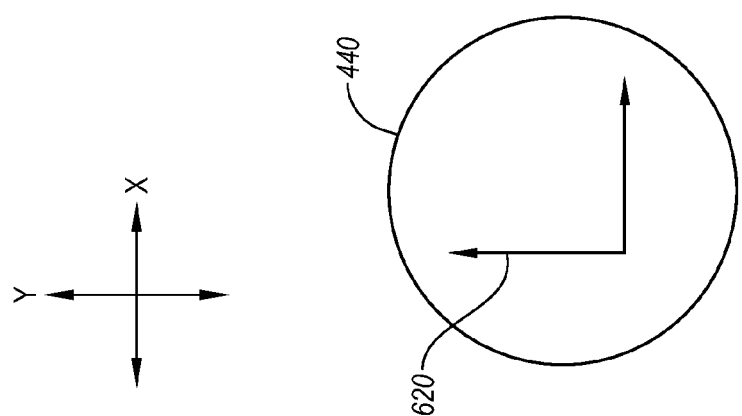

FIGS. 6A-6D illustrate second example cross sectional views along the lines A-A, B-B, C-C, D-D, respectively, of FIG. 4, arranged in accordance with at least some embodiments described herein. At line A-A, in FIG. 4, as illustrated in FIG. 6A, an optical signal 620 within the optical fiber 440 may be oriented so that the components of the optical signal 620 are aligned with the x-axis and the y-axis of the depicted Cartesian coordinate system. As illustrated in FIGS. 6B-6D, at the lines B-B, C-C, D-D, in FIG. 4, the optical signal 620 remains in the same orientation so that the components of the optical signal 620 are aligned with the x-axis and the y-axis of the depicted Cartesian coordinate system.

With combined reference to FIGS. 3-4 and 6A-6D, the path computation engine 306 may be configured to determine transmission characteristics of the modeled optical signal transmission path 400, such as the PDL, PDL OSNR penalty, NL, NL OSNR penalty, and/or combined NL and PDL OSNR penalty, for the fixed state of polarization of the optical signal.

The path computation engine 306 may also perform a simulation for different fixed states of polarization of the optical signal based on the PDL angle of the optical signal. For example, the path computation engine 306 may select a first fixed state of polarization of the optical signal that has a PDL angle of zero degrees and a second fixed state of polarization of the optical signal that has a PDL angle of 45 degrees. Additional fixed states of polarization of an optical signal with varying PDL angles may also simulated. For each simulated fixed state of polarization of an optical signal, the path computation engine 306 may be configured to determine transmission characteristics of the modeled optical signal transmission path 400, such as the PDL, PDL OSNR penalty, NL, NL OSNR penalty, and/or combined NL and PDL OSNR penalty, for the fixed state of polarization of the optical signal.

The path computation engine 306, the processor 350, or some other computation device may be configured to correlate the transmission characteristics of the modeled optical signal transmission path 400 with the one or more fixed states of polarization of an optical signal, with the transmission characteristics of the modeled optical signal transmission path 400, with the randomly changing states of polarization of an optical signal. Based on the correlation, the effective state of polarization for the modeled optical signal transmission path 400 may be obtained.

An example follows that illustrates how the effective state of polarization of the optical signal may be obtained for the modeled optical signal transmission path 400, according to some embodiments. The modeled optical signal transmission path 400 may have certain set parameters, such as a certain type of optical fiber, data modulation format, and/or dispersion map. The path computation engine 306 may perform multiple simulations on the modeled optical signal transmission path 400 with randomly changing states of polarization of an optical signal. For each simulation, the path computation engine 306 may produce transmission characteristics of the modeled optical signal transmission path 400. In particular, the path computation engine 306 may determine the accumulated combined NL and PDL OSNR penalty and PDL for the modeled optical signal transmission path 400 for each simulation. The path computation engine 306 may average the determined combined NL and PDL OSNR penalties for all of or a subset of the simulations and/or may average the determined PDLs for all of or a subset of the simulations to determine the modeled combined NL and PDL OSNR penalty and modeled PDL for the modeled optical signal transmission path 400.

Using the modeled optical signal transmission path 400 with the modeled PDL, the path computation engine 306 may determine a combined NL and PDL OSNR penalty for each of multiple fixed states of polarization of an optical signal. The fixed states of polarization of the optical signal may include a state where the PDL angle of the optical signal is 0 degrees and the PDL angle of the optical signal is 45 degrees. The PDL OSNR penalty for additional states of polarization with PDL angles of the optical signal between 0 and 45 degrees may also be determined. For example, the additional states of polarization may have PDL angles of the optical signal of 10, 20, 30, and 40 degrees. The combined NL and PDL OSNR penalties for the multiple fixed states of polarization of the optical signal may be used to determine a distribution of the combined NL and PDL OSNR penalty of the modeled optical signal transmission path 400 versus the PDL angle of the optical signal.

The fixed states of polarization of the optical signal with PDL angles of 0 and 45 degrees and angles there between may be selected because an amount of optical peak power variation due to the PDL of the optical nodes 412, 414, 416, 418 in the modeled optical signal transmission path 400 is lowest at PDL angle of the optical signal 0 degrees and highest at 45 degrees with varying amounts there between. By providing PDL angles that have the lowest and highest amount of optical peak power variations, the PDL and the interplay between PDL and NL effects, as demonstrated by the combined NL and PDL OSNR penalty, may be more accurately modeled. Note that the number of states used to determine the distribution of the combined NL and PDL OSNR penalty of the optical signal may vary and may affect the accuracy of the determined effective state of polarization for the modeled optical signal transmission path 400.

The determined distribution of the combined NL and PDL OSNR penalty of the modeled optical signal transmission path 400 versus the PDL angle of the optical signal may be correlated with the modeled combined NL and PDL OSNR penalty to determine the effective state of polarization of the optical signal. More particularly, the amount of modeled combined NL and PDL OSNR penalty may be compared with the distribution of the combined NL and PDL OSNR penalties versus the PDL angle to determine at what PDL angle the modeled optical signal transmission path 400 produced a combined NL and PDL OSNR penalty that matches the modeled combined NL and PDL OSNR penalty. The PDL angle that generated the modeled combined NL and PDL OSNR penalty may be the effective state of polarization for the modeled optical signal transmission path 400. In essence, for the modeled optical signal transmission path 400, the effective state of polarization produces a combined NL and PDL OSNR penalty that approximates the results produced by a simulation performed with randomly changing states of polarization. The effective state of polarization may also be used to determine the effect that PDL and a randomly rotating state of polarization of an optical signal may have on other transmission characteristics, such as NL effects, as modeled by the combined NL and PDL OSNR penalty.

In some embodiments, the amount of PDL within the modeled optical signal transmission path 400 may be varied. For each of the variations, the modeled PDL and the modeled PDL OSNR penalty for the modeled optical signal transmission path 400 may be determined based on multiple simulations with randomly changing states of polarization of optical signals. For each of the modeled optical signal transmission paths 400, a distribution of the combined NL and PDL OSNR penalty versus the PDL angle of the optical signal may also be determined. The effective state of polarization may be determined based on the correlation between each of the modeled combined NL and PDL OSNR and its corresponding distribution. By using multiple modeled optical signal transmission paths 400 with varying PDLs, results that are more accurate may be achieved.

The effective state of polarization may be used to model other optical signal transmission paths that have similar parameters. In particular, the effective state of polarization may be used to model other optical signal transmission paths that have the same type of optical fiber, data modulation format, and/or dispersion map as the modeled optical signal transmission path 400 that was used to derive the effective state of polarization. Other parameters in the other optical signal transmission paths may vary from the parameters used in the modeled optical signal transmission path 400 that was used to derive the effective state of polarization.

After determining the effective state of polarization of the optical signal, the path computation engine 306 may store the effective state of polarization and the one or more parameters used to obtain the effective state of polarization (i.e. type of optical fiber, data modulation format, and/or dispersion map) in the database 330.

Figure 7:
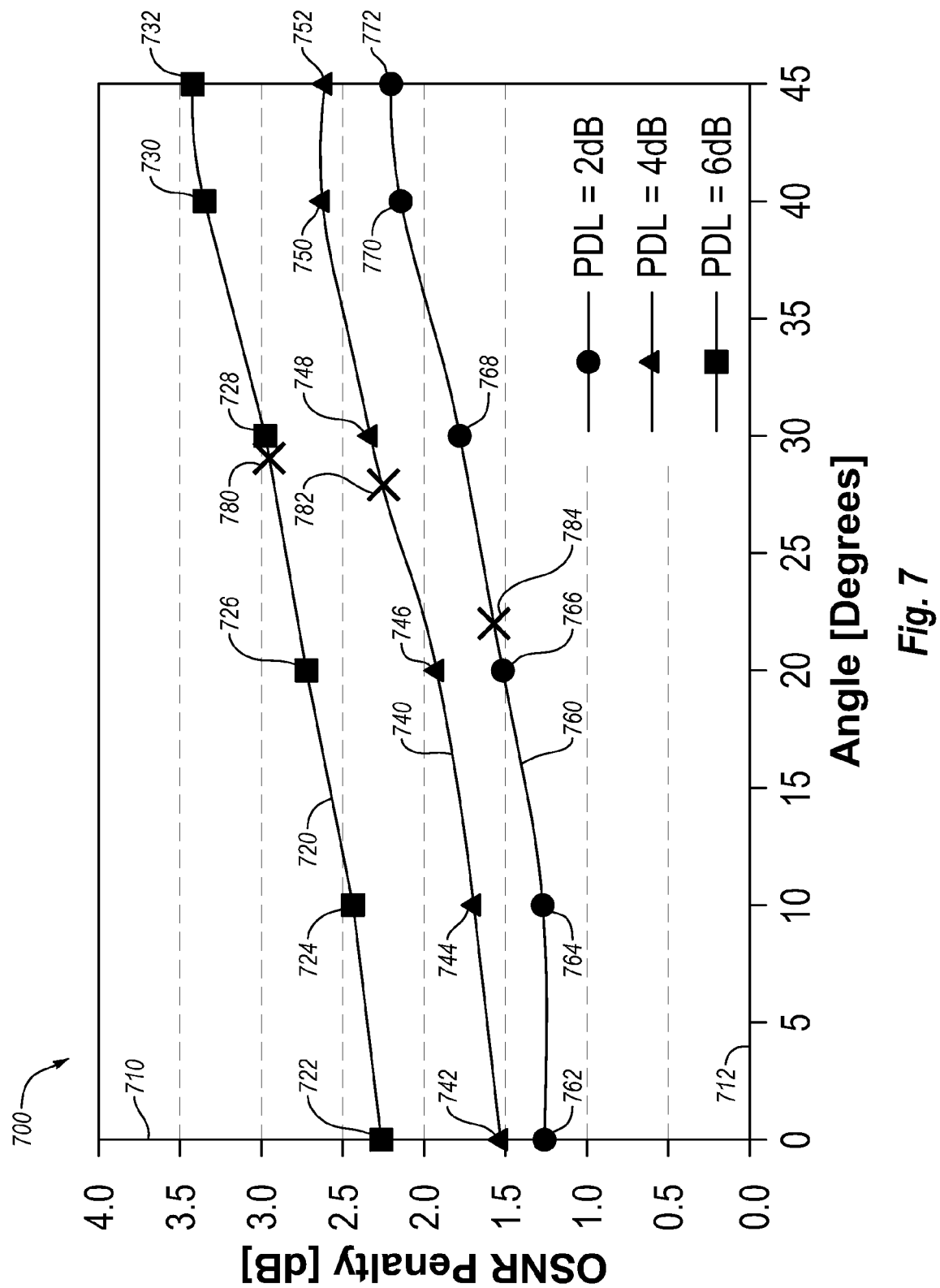
FIG. 7 illustrates an example graph used to correlate transmission characteristics to obtain an effective state of polarization of an optical signal.

FIG. 7 illustrates an example graph 700 used to illustrate correlation between transmission characteristics to obtain an effective state of polarization of an optical signal, arranged in accordance with at least some embodiments described herein. The graph 700 includes a y-axis 710 and an x-axis 712 that correlate the combined NL and PDL OSNR penalty of an optical signal transmission path with a PDL angle of an optical signal within the optical signal transmission path.

The graph 700 illustrates a first distribution 720 of combined NL and PDL OSNR penalties of a first optical signal transmission path versus the PDL angle of an optical signal in the first optical signal transmission path. The first optical signal transmission path for the first distribution 720 may have a PDL of approximately 6 dB and a first optical fiber type. The first distribution 720 may be determined based on simulations performed with fixed states of polarization of optical signals with PDL angles of 0, 10, 20, 30, 40, and 45 degrees, as represented by points 722, 724, 726, 728, 730, 732 respectively. The linear distribution illustrated on the graph 700 between the simulated points 722, 724, 726, 728, 730, 732 may be extrapolated or otherwise calculated based on the simulated points 722, 724, 726, 728, 730, 732.

The graph 700 also illustrates a second distribution 740 of combined NL and PDL OSNR penalties of a second optical signal transmission path versus the PDL angle of an optical signal in the optical signal transmission path. The second optical signal transmission path for the second distribution 740 may have a PDL of 4 dB and the first optical fiber type. Besides the difference in PDL, the second optical signal transmission path may be similar to the first optical signal transmission path. The second distribution 740 may be determined based on simulations performed with fixed states of polarization of optical signals with PDL angles of 0, 10, 20, 30, 40, and 45 degrees, as represented by points 742, 744, 746, 748, 750, 752 respectively. The linear distribution illustrated on the graph 700 between the simulated points 742, 744, 746, 748, 750, 752 may be extrapolated or otherwise calculated based on the simulated points 742, 744, 746, 748, 750, 752.

The graph 700 also illustrates a third distribution 760 of combined NL and PDL OSNR penalties of a third optical signal transmission path versus the PDL angle of an optical signal in the optical signal transmission path. The third optical signal transmission path for the third distribution 760 may have a PDL of 2 dB and the first optical fiber type. Besides the difference in PDL, the third optical signal transmission path may be similar to the first and second optical signal transmission paths. The third distribution 760 may be determined based on simulations performed with fixed states of polarization of optical signals with PDL angles of 0, 10, 20, 30, 40, and 45 degrees, as represented by points 762, 764, 766, 768, 770, 772 respectively. The linear distribution illustrated on the graph 700 between the simulated points 762, 764, 766, 768, 770, 772 may be extrapolated or otherwise calculated based on the simulated points 762, 764, 766, 768, 770, 772.

A modeled combined NL and PDL OSNR penalty for the first optical signal transmission path based on multiple simulations with randomly changing states of polarization of optical signals may also be determined. The modeled combined NL and PDL OSNR penalty for the first optical signal transmission path may be mapped onto the first distribution 720 as illustrated by an X 780 and may be used to determine an effective state of polarization of approximately 29 or 30 degrees for the first optical signal transmission path.

A modeled combined NL and PDL OSNR penalty for the second optical signal transmission path based on multiple simulations with randomly changing states of polarization of optical signals may also be determined. The modeled combined NL and PDL OSNR penalty for the second optical signal transmission path may be mapped onto the second distribution 740 as illustrated by an X 782 and may be used to determine an effective state of polarization of approximately 28 degrees for the second optical signal transmission path.

A modeled combined NL and PDL OSNR penalty for the third optical signal transmission path based on multiple simulations with randomly changing states of polarization of optical signals may also be determined. The modeled combined NL and PDL OSNR penalty for the third optical signal transmission path may be mapped onto the third distribution 760 as illustrated by an X 784 and may be used to determine an effective state of polarization of approximately 23 degrees for the third optical signal transmission path.

The effective state of polarization for the first optical fiber type may be determined based on the effective states of polarization for the first, second, and third optical signal transmission paths. In some embodiments, the effective state of polarization for the first optical fiber type may be a mean, medium, weighted mean, or some other combination of the effective states of polarization for the first, second, and third optical signal transmission paths. In other embodiments, the effective state of polarization for the first optical fiber type may be the largest effective state of polarization for the first, second, and third optical signal transmission paths. Selecting the largest effective state of polarization for the first, second, and third optical signal transmission paths may result in the largest combined NL and PDL OSNR penalty when modeling an optical signal transmission path. In some circumstances, having the largest combined NL and PDL OSNR penalty for a simulation may allow for error in the modeling without compromising a design based on the modeling.

Figure 8:
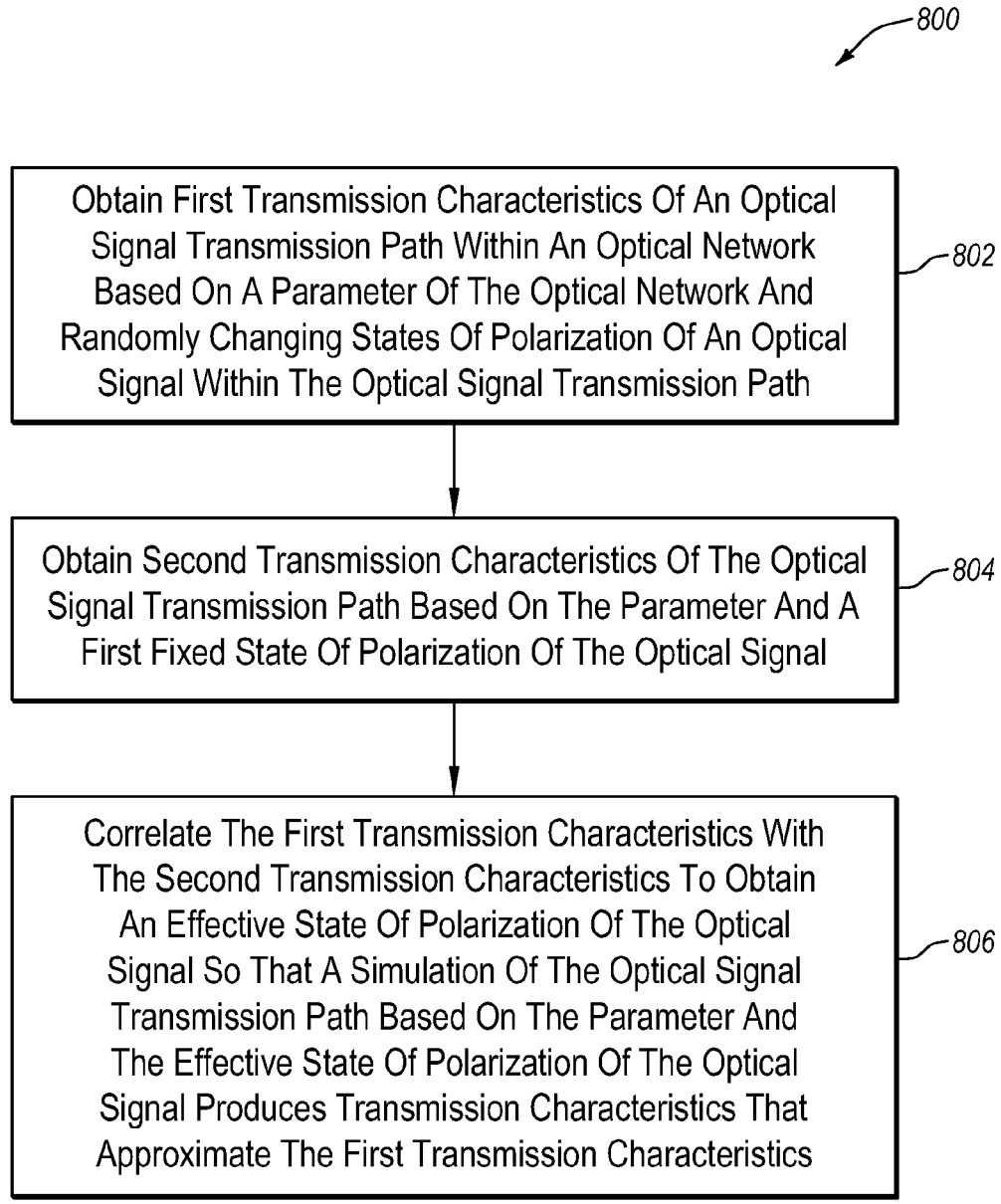
FIG. 8 is a flow chart of an example method of modeling an optical network.

FIG. 8 is a flow chart of an example method 800 of modeling an optical network, arranged in accordance with at least some embodiments described herein. The method 800 may be implemented, in some embodiments, by a modeling system, such as the system 300 for modeling transmission characteristics of an optical network of FIG. 3. For instance, the path computation engine 306 of the system 300 of FIG. 3 may be configured to execute computer instructions to perform operations for modeling an optical network as represented by one or more of blocks 802, 804, and/or 806 of the method 800. Although illustrated as discrete blocks, various blocks may be divided into additional blocks, combined into fewer blocks, or eliminated, depending on the desired implementation.

The method 800 may begin at block 802, in which first transmission characteristics of an optical signal transmission path within an optical network may be obtained. The first transmission characteristics may be based on a parameter of the optical network and randomly changing states of polarization of an optical signal within the optical signal transmission path.

In some embodiments, the first transmission characteristics may be based on a plurality of simulations of the optical signal transmission path that produce transmission characteristics of the optical signal transmission path. The simulations may be performed using the parameter and randomly changing states of polarization of the optical signal. For example, in some embodiments, 500, 1000, 5000, 10000, or some other amount of simulations may be performed.

In block 804, second transmission characteristics of the optical signal transmission path may be obtained based on the parameter and a first fixed state of polarization of the optical signal. In some embodiments, the second transmission characteristics may be based on a single simulation of the optical signal transmission path using the first fixed state of polarization may be obtained. In these and other embodiments, the first fixed state of polarization of the optical signal may be the optical signal having a fixed PDL angle throughout the simulation that produces the second transmission characteristics.

The first and second transmission characteristics may include polarization dependent loss within the optical signal transmission path, non-linear optical effects within the optical signal transmission path, polarization mode dispersion within the optical signal transmission path, and amplified spontaneous emission effects within the optical signal transmission path. Alternately or additionally, each of the first and second transmission characteristics may be expressed as an OSNR penalty.

The parameter used to determine the first and second transmission characteristics may include a type of fiber carrying the optical signal, dispersion characteristics of the optical signal within the optical signal transmission path, a modulation format of the optical signal, an input power of the optical signal, a length of the optical signal transmission path, and a data rate for the optical signal transmission path.

In block 806, the first transmission characteristics may be correlated with the second transmission characteristics to obtain an effective state of polarization of the optical signal so that a simulation of the optical signal transmission path based on the parameter and the effective state of polarization of the optical signal produces transmission characteristics that approximate the first transmission characteristics. In some embodiments, the effective state of polarization of the optical signal may have an angle between an axis of polarization of the optical signal and an axis of polarization dependent loss of the optical signal between zero and 45 degrees In some embodiments, a simulation of the optical signal transmission path using the effective state of polarization may estimate transmission characteristics resulting from interactions between NL and PDL effects and the randomly changing states of polarization of the optical signal.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For instance, the method 800 may further include generating a database that associates the effective state of polarization with the parameter. Alternately or additionally, the method 800 may further include obtaining third transmission characteristics of the optical signal transmission path based on the parameter and a second fixed state of polarization of the optical signal, wherein the effective state of polarization of the optical signal is based on a correlation of the first transmission characteristics with the second and third transmission characteristics.

Figure 9:
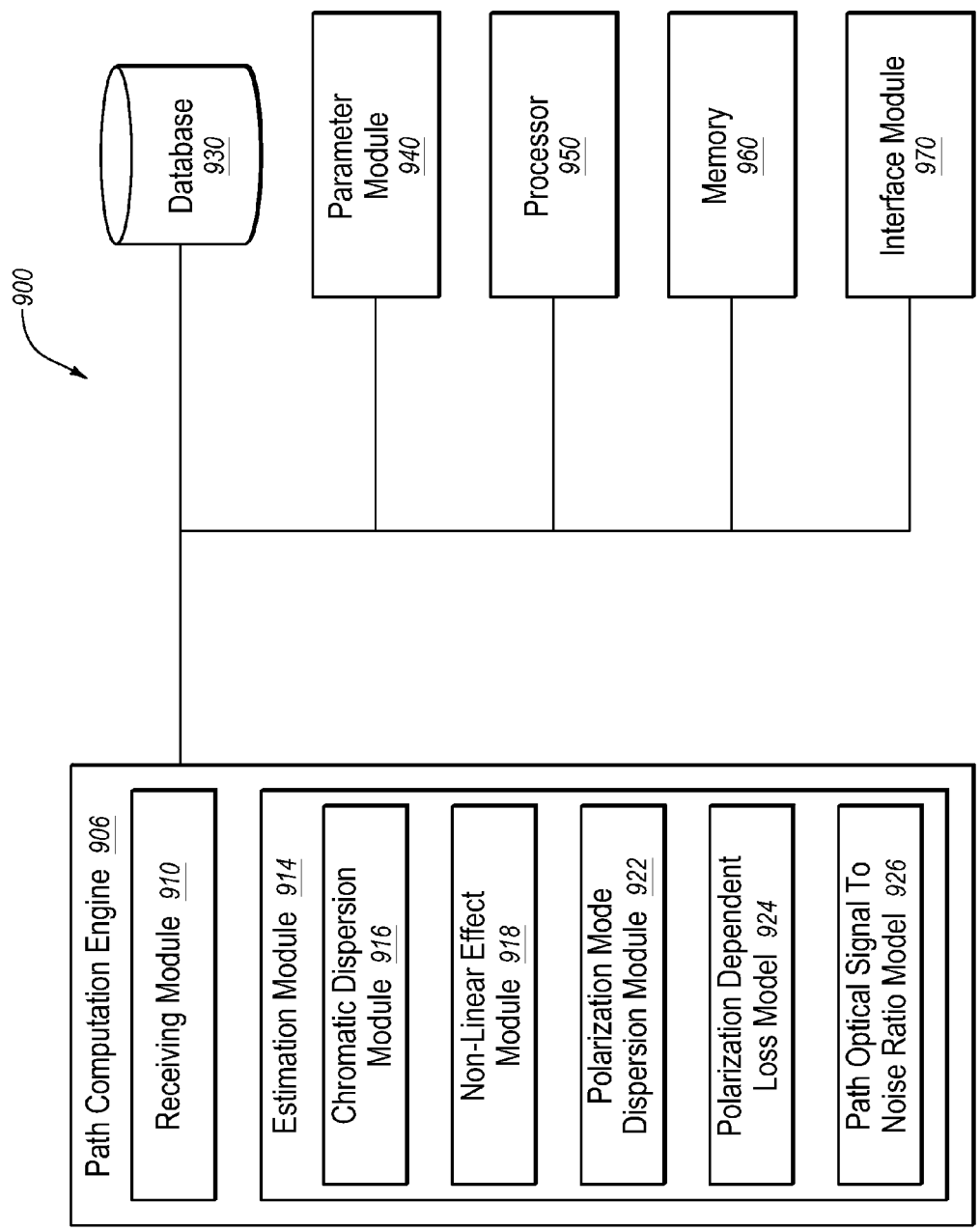
FIG. 9 is a block diagram of an example system for modeling transmission characteristics of an optical signal transmission path, all arranged in accordance with at least some embodiments described herein.

FIG. 9 is a block diagram of an example system 900 for modeling transmission characteristics of an optical signal transmission path, arranged in accordance with at least some embodiments described herein. The system 900 may include a path computation engine 906, a database 930, a parameter module 940, a processor 950, a memory 960, and an interface module 970.

The interface module 970 may be configured to receive data concerning an optical signal transmission path in an optical network that is to be modeled. For example, in some embodiments, the interface module 970 may be configured to interface with a person and receive data about the optical signal transmission path. Alternately or additionally, the interface module 970 may be configured to receive data about the optical signal transmission path from a device. The interface module 970 may receive data about the optical signal transmission path, such as, fiber type; fiber length; number and/or type of components, such as a DCM, ADM, amplifier, multiplexer, or demultiplexer, in the optical signal transmission path; data rate; modulation format of the data; input power of the optical signal; number of channels, channel spacing; traffic demand; network topology; among others. Similar to the interface module 370 of FIG. 3, the interface module 970 of FIG. 9 may include and/or be coupled to one or more input and/or output devices to facilitate receiving data from the person and/or outputting simulation results to the person.

The parameter module 940 may be configured to provide parameters concerning the optical signal transmission path based on the data received about the optical signal path. For example, the parameter module 940 may provide parameters regarding the fiber type, such as a dispersion map for the fiber type and other optical properties of the fiber type. As another example, the parameter module 940 may provide parameters concerning the components in the optical signal transmission path. For example, the parameters of the components provided by the parameter module 940 may include, the PDL caused by the components and other optical properties of the components. In essence, the parameter module 940 may provide some of or all of the optical properties of the components in the optical signal transmission path that the path computation engine 906 may use to model the optical signal transmission path.

The database 930 may contain effective states of polarization for different optical signal transmission paths. For example, the database 930 may contain effective states of polarization for different types of fiber that may be used in the optical signal transmission paths. Alternately or additionally, the database 930 may contain effective states of polarization for different fiber types as well as for each different modulation format of the data transmitted over the fiber type. Alternately or additionally, the database 930 may contain effective states of polarization for optical signal transmission paths with different dispersion maps.

The path computation engine 906 may be configured to use the parameters from the parameter module 940 and data from the interface model 970 and the database 930 to determine transmission characteristics of the optical signal transmission path. In particular, the path computation engine 906 may contain a receiving module 910 and an estimation module 914. The receiving module 910 may be configured to receive parameters from the parameter module 940 and data from the interface module 970 and the database 930. In particular, the receiving module 910 may receive parameters and data from the parameter module 940 and the interface module 970 respectively and may use the parameters and data to select an effective state of polarization from the database 930. The receiving module 910 may send the parameters, data, and effective state of polarization to the estimation module 914.

For example, the interface module 970 may be configured to receive information concerning the type of fiber used in the optical signal transmission path and the modulation format of data transmitted over the fiber. The interface module 970 may send the data to the receiving module 910. The receiving module 910 may use the data to select an effective state of polarization from the database 930 that corresponds to the received fiber type and modulation format.

The estimation module 914 may be configured to receive the parameters, data, and effective state of polarization from the receiving module 910 and to estimate, based on the effective state of polarization, the parameters, and the data, transmission characteristics of the optical signal transmission path resulting from randomly changing states of polarization of an optical signal within the optical signal transmission path. By using the effective state of polarization, the estimation module 914 may estimate transmission characteristics resulting from interactions between PDL of the optical signal transmission path and NL optical effects within the optical signal transmission path without running hundreds or thousands of simulations with randomly changing states of polarization. Using the effective state of polarization may allow the estimation module 914 to perform the estimations of the transmission characteristics of an optical signal transmission path hundreds of times faster than by using randomly changing states of polarization while still accounting for the interplay between the PDL effects and NL effects of the optical signal transmission path.

To estimate the transmission characteristics, the estimation module 914 may contain a chromatic dispersion module (CD module) 916, a non-linear effect module (NL module) 918, a polarization mode dispersion module (PMD module) 922, a polarization dependent loss module (PDL module) 924, and a path optical signal to noise ratio module (POSNR module) 926.

The POSNR module 926 may be configured to calculate the optimal OSNR that may be achieved based on the received parameters and data about the optical signal transmission path, assuming no transmission degradation due to transmission degradation factors, such as CD, NL, PMD, PDL, and others.

The CD module 916 may be configured to determine the degradation effect of chromatic dispersion along the optical signal transmission path. In some embodiments, the CD module 916 may determine a CD OSNR penalty for the optical signal transmission path.

The NL module 918 may be configured to determine the degradation effect of NL effects along the optical signal transmission path. In some embodiments, the NL module 918 may determine the NL effects based on data such as the fiber type, modulation format of the data transmitted along the optical signal transmission path, channel spacing within the optical signal transmission path, number of channels within the optical signal transmission path, and dispersion map of the optical signal transmission path. In some embodiments, the NL module 918 may determine an NL OSNR penalty for the optical signal transmission path.

The PMD module 922 may be configured to determine the degradation effect of PMD along the optical signal transmission path. In some embodiments, the PMD module 922 may determine a PMD OSNR penalty for the optical signal transmission path.

The PDL module 924 may be configured to determine the degradation effect of PDL along the optical signal transmission path. When accounting for randomly changing states of polarization of an optical signal along the optical signal transmission path, the amount of PDL may vary based on the PDL angle of the optical signal. Under these circumstances, the PDL for the optical signal transmission path may be calculated based on non-uniform distributions of PDL. In some embodiments, the PDL module 924 may determine a PDL OSNR penalty for the optical signal transmission path.

In some embodiments, either the PDL module 922 or the NL module 918 may determine the degradation effects of both NL and PDL and the interplay between NL and PDL using the effective state of polarization. In these and other embodiments, a combined NL and PDL OSNR penalty for the optical signal transmission path may also be determined. In these circumstances, when the combined NL and PDL OSNR penalty is calculated, the individual NL and PDL OSNR penalties may not be calculated by the estimation module 914 and one of the PDL module 922 or the NL module 918 may not be utilized.

In some embodiments, the estimation module 914 may combine the calculated OSNR penalties, such as the PDL OSNR penalty, the CD OSNR penalty, the NL OSNR penalty, the PMD OSNR penalty to determine a combined OSNR penalty for the optical signal transmission path. In other embodiments, the estimation module 914 may combine the calculated OSNR penalties, such as the combined NL and PDL OSNR penalty, the CD OSNR penalty, and the PMD OSNR penalty to determine a combined OSNR penalty for the optical signal transmission path. The estimation module 914 may provide the estimated OSNR for the optical signal transmission path by subtracting the combined OSNR penalty from the optimal OSNR calculated by the POSNR module 926. The estimated OSNR for the optical signal transmission path may be used in designing and verifying designs for the optical signal transmission path.

In some embodiments, the processor 950 may be configured to execute computer instructions that cause the system 900 to perform the functions and operations described herein. The computer instructions may be loaded into the memory 960 for execution by the processor 950 and/or data generated, received, or operated on during performance of the functions and operations described herein may be at least temporarily stored in the memory 960.

Although the path computation engine 906 illustrates various discrete components, such as the estimation module 914 and the receiving module 910, various components may be divided into additional components, combined into fewer components, or eliminated, depending on the desired implementation. In some embodiments, the system 900 may be similar to system 300. Additionally or alternately, the system 900 may differ from system 300 in that the system 900 may not randomly rotate the state of polarization of an optical signal to determine the interplay between the NL effects and the PDL effects. In these and other embodiments, the system 900 may use the effective state of polarization to determine the interplay between the NL effects and the PDL effects.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may comprise tangible computer-readable including RAM, ROM, EEPROM, CD-ROM or other optical disk storage, magnetic disk storage or other magnetic storage devices, or any other medium which may be used to carry or store desired program code means in the form of computer-executable instructions or data structures and which may be accessed by a general purpose or special purpose computer. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A computer-implemented method of modeling an optical signal transmission path, the method comprising:
    obtaining first transmission characteristics of an optical signal transmission path within an optical network based on a parameter of the optical network and randomly changing states of polarization of an optical signal within the optical signal transmission path;
    obtaining a plurality of second transmission characteristics of the optical signal transmission path, each of the plurality of second transmission characteristics being based on the parameter and a different one of a plurality of fixed states of polarization of the optical signal such that each of the plurality of second transmission characteristics is associated with the one of the plurality of fixed states of polarization on which each of the plurality of second transmission characteristics is based, wherein each of the fixed states of polarization of the optical signal has a different fixed angle between an axis of polarization of the optical signal and an axis of polarization dependent loss of the optical signal within the optical signal transmission path;
    selecting one or more of the plurality of second transmission characteristics based on a comparison of the first transmission characteristics with the plurality of second transmission characteristics;
    determining an effective state of polarization for the optical signal transmission path based on the fixed states of polarization associated with the selected one or more of the plurality of second transmission characteristics such
    that a simulation of the optical signal transmission path based on the parameter and the effective state of polarization produces transmission characteristics that approximate the first transmission characteristics; and
    modeling the optical signal transmission path using the effective state of polarization.

2. The computer-implemented method of claim 1, further comprising generating a database that associates the effective state of polarization with the parameter.

3. The computer-implemented method of claim 1, wherein the parameter includes a type of fiber carrying the optical signal, dispersion characteristics of the optical signal within the optical signal transmission path, or a modulation format of the optical signal.

4. The computer-implemented method of claim 1, wherein the first transmission characteristics are based on a plurality of simulations of the optical signal transmission path that produce transmission characteristics of the optical signal transmission path, the simulations performed using the parameter and randomly changing states of polarization of the optical signal.

5. The computer-implemented method of claim 1, wherein the effective state of polarization of the optical signal has an angle between an axis of polarization of the optical signal and an axis of polarization dependent loss of the optical signal between zero and 45 degrees.

6. The computer-implemented method of claim 1, wherein the first and second transmission characteristics comprise an optical signal to noise ratio of the optical signal.

7. A processor configured to execute computer instructions to cause a system to perform operations to model an optical signal transmission path, the operations comprising:
    obtaining first transmission characteristics of an optical signal transmission path within an optical network based on a parameter of the optical network and randomly changing states of polarization of an optical signal within the optical signal transmission path;
    obtaining a plurality of second transmission characteristics of the optical signal transmission path, each of the plurality of second transmission characteristics being based on the parameter and a different one of a plurality of fixed states of polarization of the optical signal such that each of the plurality of second transmission characteristics is associated with the one of the plurality of fixed states of polarization on which each of the plurality of second transmission characteristics is based, wherein each of the fixed states of polarization of the optical signal has a different fixed angle between an axis of polarization of the optical signal and an axis of polarization dependent loss of the optical signal within the optical signal transmission path;

selecting one or more of the plurality of second transmission characteristics based on a comparison of the first transmission characteristics with the plurality of second transmission characteristics;

determining an effective state of polarization for the optical signal transmission path based on the fixed states of polarization associated with the selected one or more of the plurality of second transmission characteristics such that a simulation of the optical signal transmission path based on the parameter and the effective state of polarization produces transmission characteristics that approximate the first transmission characteristics; and modeling the optical signal transmission path using the effective state of polarization.

8. The processor of claim 7, further comprising generating a database that associates the effective state of polarization with the parameter.

9. The processor of claim 7, wherein the parameter includes a type of fiber carrying the optical signal, dispersion characteristics of the optical signal within the optical signal transmission path, or a modulation format of the optical signal.

10. The processor of claim 7, wherein the first transmission characteristics are based on a plurality of simulations of the optical signal transmission path that produce transmission characteristics of the optical signal transmission path, the simulations performed using the parameter and randomly changing states of polarization of the optical signal.

11. The processor of claim 7, wherein the effective state of polarization of the optical signal has an angle between an axis of polarization of the optical signal and an axis of polarization dependent loss of the optical signal between zero and 45degrees.

12. The processor of claim 7, wherein the first and second transmission characteristics comprise an optical signal to noise ratio of the optical signal.

13. A computer-implemented method of modeling an optical signal transmission path, the method comprising:

obtaining a plurality of first noise ratio penalties of an optical signal transmission path within an optical network, each of the plurality of first noise ratio penalties determined based on a parameter of the optical network and a different randomly changing state of polarization of an optical signal within the optical signal transmission path;

determining a second noise ratio penalty based on the plurality of first noise ratio penalties;

obtaining a plurality of third noise ratio penalties of the optical signal transmission path, each of the plurality of third noise ratio penalties being determined based on the parameter and a different one of a plurality of fixed polarization angles of the optical signal, wherein each of the plurality of fixed polarization angles of the optical signal includes the optical signal having a fixed angle between an axis of polarization of the optical signal and an axis of polarization dependent loss of the optical signal within the optical signal transmission path;

determining a relationship between polarization angles and optical signal noise ratio penalties of the optical signal transmission path based on the plurality of third noise ratio penalties;

determining an effective polarization angle for the optical signal transmission path based on the effective polarization angle resulting in the second noise ratio penalty according to the relationship between the polarization angles and the optical signal noise ratio penalties of the optical signal transmission path such that a simulation of the optical signal transmission path based on the parameter and the effective polarization angle produces transmission characteristics that approximate the second noise ratio penalty; and modeling a second optical signal transmission path using the effective polarization angle and the parameter.

14. The computer-implemented method of claim 13, wherein second noise ratio penalty is based on degradation due to polarization dependent lose and nonlinear effects.

15. The computer-implemented method of claim 13, wherein the fixed angle varies between zero and forty-five degrees.

16. The computer-implemented method of claim 13, wherein the parameter includes a type of fiber carrying the optical signal, dispersion characteristics of the optical signal within the optical signal transmission path, or a modulation format of the optical signal.

* * * * *